3,657,275
DIBENZOOXAZEPINES AND DIBENZO-
THIAZEPINES
Harry L. Yale and Jack Bernstein, New Brunswick, N.J.,
assignors to E. R. Squibb & Sons, Inc., Princeton, N.J.
No Drawing. Continuation-in-part of application Ser. No.
551,560, May 20, 1966. This application Mar. 9, 1970,
Ser. No. 17,972
Int. Cl. A61k 27/00; C07d 87/54, 89/20
U.S. Cl. 260—327 B     1 Claim

ABSTRACT OF THE DISCLOSURE

Therapeutically active compounds utilizable as ataractic agents and as sedatives and hypotensive agents having the formula

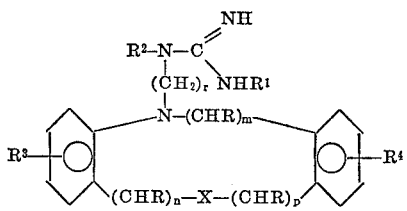

wherein R, $R^1$ and $R^2$ are hydrogen, lower alkyl, phenyl or phenyl-lower alkyl; $R^3$ and $R^4$ are hydrogen, halogen, lower alkyl, trifluoromethyl, or lower alkoxy; X is oxygen or sulfur, r is 2 to 5; m is 0 or 1; n and p are each 0, 1 or 2; provided that the sum of $m+n+p$ being from 1 to 3, and that when m equals 1 and n and p are each 0, X is sulfur.

RELATED APPLICATION

This application is a continuation-in-part of copending application Ser. No. 551,560 filed May 20, 1966, now abandoned.

DETAILED DESCRIPTION

This invention relates to novel physiologically active substances of the formula (I)

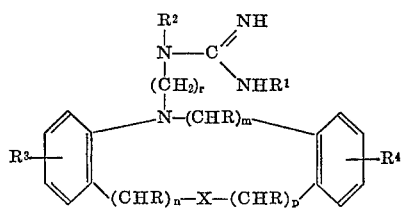

wherein R, $R^1$ and $R^2$ may be the same or different and represent hydrogen, lower alkyl, monocyclic arylalkyl or monocyclic aryl; $R^3$ and $R^4$ may be the same or different and represent hydrogen, halogen, lower alkyl, cyclolower alkyl, cyano, lower haloalkyl, lower alkoxy, lower alkylthio, lower alkylsulfinyl, lower alkylsulfonyl, lower haloalkoxy, lower haloalkylthio, amidosulfonyl or N,N-dilower alkylamidosulfonyl; X represents oxygen or sulfur; m is 0 or 1; n is 0, 1 or 2; p is 0, 1 or 2; and the sum of $m+n+p=1$ to 3, r is 2 to 5, and salts thereof.

The terms "lower alkyl" and "lower alkoxy," as employed herein, include both straight and branched chain radicals of less than eight carbon stems. All four halogens are contemplated.

By monocyclic aryl radicals is meant phenyl and substituted phenyl radicals such as lower alkylphenyl, e.g., o-, m-, or p-tolyl, ethylphenyl; di-lower alkylphenyl, e.g., p-xylyl; lower alkoxyphenyl, e.g., methoxyphenyl; halophenyl, e.g., chlorophenyl, bromo-phenyl, etc. Monocyclic arylalkyl includes, for instance, phenyl-lower alkyl, e.g., benzyl, phenethyl, etc.

As to the salts of the compounds of this invention, those coming within the purview of this invention include the acid-addition salts, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

Compounds of this invention are therapeutically active compounds which are utilizable as ataractic agents, and thus may be used in the treatment of depressed psychotic states, and as sedatives and hypotensive agents for the treatment of high blood pressure. For these purposes, they may be administered orally or parenterally in such form as tablets, capsules, injectables, or the like by incorporating the appropriate dosage of the compound with carriers according to accepted pharmaceutical practices.

The dose for humans would be between 20 and 200 mg./day for the first week of therapy, 30–300 mg./day for the second week, and, thereafter, dosage would be adjusted for maintenance of therapeutic effect.

The compounds of Formula I may be produced by reacting a compound of the formula (II)

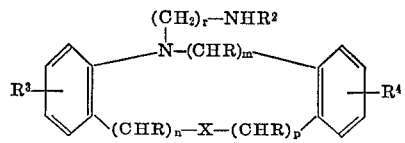

wherein R, $R^2$, $R^3$, $R^4$, X, m, n, p and r are as defined above, with a compound selected from the group consisting of cyanogen bromide, cyanamide, substituted cyanamides, 2-alkyl-2-thiopseudourea sulfate and substituted 2-alkyl-2-thiopseudourea sulfates. As examples of substituted cyanamides may be mentioned lower alkyl cyanamides such as ethyl cyanamide and pentyl cyanamide; aryl cyanamides such as phenyl cyanamides and p-tolyl cyanamide; phenyl lower alkyl cyanamides such as benzyl cyanamide and phenethyl cyanamide; lower-alkyl phenylene-lower alkylcyanamide such as 3-p-tolyl propyl cyanamide. As examples of substituted 2-alkyl-2-thiopseudourea sulfates may be mentioned 1-lower alkyl-2-methyl-2-thiopseudourea sulfate such as 1-ethyl-2-methyl-2-thiopseudourea sulfate and 1-pentyl-2-methyl-2-thiopseudourea sulfate; 1-aryl-2-methyl - 2 - thiopseudourea sulfate such as 1-phenyl-2-methyl-2-thiopseudourea sulfate and 1-p-tolyl - 2 - methyl - 2 - thiopseudourea sulfate; 1-phenyl lower alkyl-2-methyl - 2 - thiopseudourea sulfate such as 1-benzyl-2-methyl - 2 - thiopseudourea sulfate and 1-phenethyl-2-methyl - 2 - thiopseudourea sulfate; 1-lower alkylphenylene-lower alkyl - 2 - methyl - 2 - thiopseudourea sulfate such as 1-(3-p-tolylpropyl) - 2 - methyl - 2 - thiopseudourea sulfate.

Reaction with cyanogen bromide results in the cyanamide derivative which is then reacted with, for instance, a combination of ammonium sulfate and ammonium hydroxide to obtain the desired guanidine product.

Compounds of Formula II may be produced by reacting a compound of the formula (III)

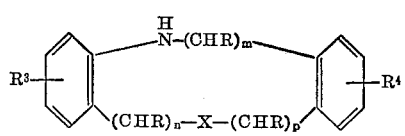

with a haloacyl halide, preferably wherein the halogens are chlorine, e.g., α-chloroacetyl chloride, β-chloropropionyl chloride, β-chloro - α - methylpropionyl chloride, chlorobutyryl chloride or the like. This reaction, in which the haloacyl halide is preferably utilized in excess, produces an intermediate of the formula (IV)
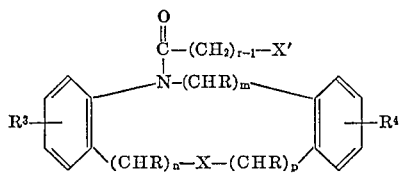

X' represents a halogen atom.

Reduction of the compound of Formula IV with a metal hydride such as lithium aluminum hydride or sodium borohydride in an organic solvent produces a compound of the formula (V)
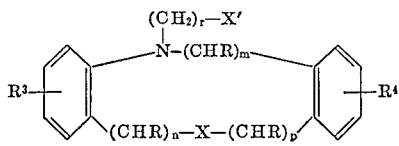

A compound of Formula V may also be prepared by reacting a compound of Formula III with a halo alkanol such as 2-chloroethanol and 2-bromoethanol to obtain the hydroxy alkyl derivative which is then converted to the halide by reaction with, for instance, a thionyl halide such as thionyl chloride. The hydroxy alkyl derivative has the formula

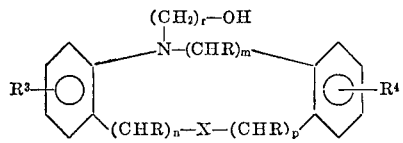

wherein R, $R^3$, $R^4$, X, r, m, n and p are as previously defined.

The compound of Formula V will then react with an amine, preferably used in excess and in a non-aqueous organic solvent such as toluene, to produce the product of Formula II.

Alternatively, the compound of Formula IV may first be condensed with the amine and then the resulting condensation product of the formula (VI)
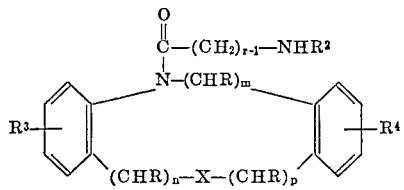

reduced with a metal hydride in the same manner described previously.

As a further alternative, a compound of the Formula III may be reacted with an Ω-haloalkylenehalide, e.g., trimethylene chlorobromide, tetramethylene chlorobromide or hexamethylene chlorobromide in the presence of an alkaline condensing agent, e.g., sodium hydride, sodium amide, or sodium hydroxide to give the haloalkylene intermediate which is then reacted with an amine as defined above to give a compound of Formula II.

The lower alkylene halide derivative obtained through the above processes may alternatively be reacted with an alkali metal phthalimide salt such as potassium phthalimide and the resulting product, of the formula (VII)
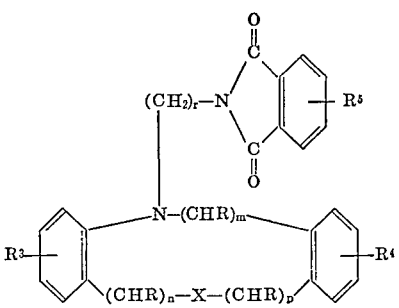

is then converted to the desired amine by reaction with hydrazine; $R^5$ in the above formula may be selected from the group consisting of hydrogen, halogen, lower alkyl, cyclolower alkyl, cyano, lower haloalkyl, lower alkoxy, lower alkylthio, lower alkyl sulfenyl, lower alkyl sulfonyl, lower haloalkoxy, lower haloalkylthio, amidosulfonyl and N,N-dilower alkylamidosulfonyl.

Alternatively, a compound of Formula III may be reacted with an unsaturated nitrile such as acrylonitrile, methacrylonitrile or crotononitrile in the presence of a catalyst such as benzyltrimethylammonium hydroxide and a solvent such as water or an alcohol, to obtain a corresponding nitrilo derivative which is in turn reduced by means of reaction with a metal hydride to obtain the desired amine of Formula II.

Alternatively, the above nitrilo derivative may be first reacted with sulfuric acid to obtain the corresponding carboxamide derivative which is then reduced with a metal hydride.

In Formulas III to VII above, R, $R^3$, $R^4$, X, m, n, p and r are as defined hereinabove.

Compounds of Formula I may also be produced by reacting a compound of Formula II with ammonium thiocyanate to obtain the corresponding thiourea derivative. This reaction may be carried out, for instance, by refluxing the reactants in a solvent such as ethanol, until the desired product, is formed.

The thiourea derivative may then be treated with a combination of aqueous ammonia and a mercuric halide (particularly mercuric chloride) to give desired corresponding guanidine.

Alternatively, the thiourea derivative may be reacted with a methylating agent, such as dimethyl sulfate or methyl iodide to give the corresponding 2-methyl-2-thiopseudourea derivative which is then converted to the desired guanidine product by reaction with a combination of ammonium hydroxide and ammonium sulfate.

The compounds of Formula III may be prepared through any of several processes, dependent upon the particular compound desired, as set forth in applicants' copending U.S. application Ser. No. 546,193, filed Apr. 29, 1966, now U.S. Pat. 3,452,046, issued 24 June 1969.

EXAMPLE 1

(a) 5,11-dihydro-7-(trifluoromethyl)dibenz[b,e][1,4]oxazepine-5-propionamide

To 40 ml., 97% $H_2SO_4$ at room temperature is added in small portions 7.0 g. of powdered 5,11-dihydro-7-(trifluoromethyl)dibenz[b,e][1,4]oxazepine-5 - propionitrile. The mixture is subsequently stirred for one hour and poured into 400 ml. of ice. The solid product is filtered to give 5,11 - dihydro - 7-(trifluoromethyl)dibenz[b,e,][1,4]oxazepine-5-propionamide, M.P. about 149.5–151° after recrystallization from Skellysolve E.

EXAMPLE 2

5,11-dihydrodibenz[b,e][1,4]oxazepine-5-propionamide

By substituting 7.0 g. of 5,11-dihydrodibenz[b,e][1,4]oxazepine-5-propionitrile for the 5,11-dihydro-7-(trifluoromethyl)dibenz[b,e][1,4]oxazepine-5-propionitrile in Example 1, there is obtained 5,11-dihydrodibenz[b,e][1,4]oxazepine-5-propionamide, M.P. about 155–157°.

EXAMPLE 3

5,11-dihydrodibenz[b,e][1,4]oxazepine-5-propylamine hydrochloride (a) To 1.81 g. of lithium aluminum hydride in 266 ml. of anhydrous ether is added 8.0 g. of 5,11-dihydrobenz [b,e][1,4]oxazepine-5-propionitrile. Subsequently, the mixture is hydrolyzed, the ether layer separated, dried, clarified, and treated with hydrogen chloride to give 5,11-dihydrodibenz[b,e][1,4]oxazepine-5-propylamine hydrochloride, M.P. about 249.0–0.253.5°.

(b) When the product from (a) is dissolved in a minimum amount of water and the pH adjusted to about 10, 5,11-dihydrodibenz[b,e][1,4]oxazepine - 5 - propylamine separates and is recovered; it is obtained as a colorless solid, M.P. about 39–40°.

EXAMPLE 4

1-{3-[5,11-dihydrodibenz[b,e][1,4]oxazepin-5-yl] propyl}guanidine hemisulfate A mixture of the product from Example 3(b), 6.80 g., 4.09 g. of 2-methyl-2-thiopseudourea sulfate, and 100 ml. of 95% ethanol is refluxed for 6 hours to give 1-{3-[5,11-dihydrodibenz[b,e][1,4]oxazepin - 5 - yl]propyl}guanidine hemisulfate, M.P. about 212–215°, after recrystallization from water.

EXAMPLE 5

1-{3-[2-chloro-11,12-dihydro-6H-dibenzo[b,f][1,4]thiazocin-12-yl]propyl}-3-methylguanidine hemisulfate (a) To 26.2 g. of 2-chloro-11,12-dihydro-6H-dibenzo [b,f][1,4]thiazocine and 60.0 ml. of freshly distilled acrylonitrile at 0° is added dropwise with vigorous stirring, 0.6 ml. of a 40% solution of Triton B in methanol. An exothermic reaction ensues. Subsequently, the mixture is stirred for 4 hours at room temperature to give 2-chloro-11,12-dihydro-6H-dibenzo[b,f][1,4]thiazocine - 12 - propionitrile.

(b) By substituting 6.28 g. of the finely powdered product from (a) for the 7.0 g. of 5,11-dihydro-7-(trifluoromethyl)dibenz[b,e,][1,4]oxazepine-5-propionitrile in Example 2, there is obtained 2-chloro-11,12-dihydro-6H-dibenzo[b,f][1,4]thiazocine-12-propionamide.

(c) To 600 ml. of a clear, filtered anhydrous ether solution containing 4.0 g. of lithium aluminum hydride is added in small portions 16.6 g. of the finely powdered product from (b). Subsequently, the mixture is stirred for 3 hours at room temperature and hydrolyzed. The ether layer is separated, the aqueous sludge is repeatedly extracted with ether, and the combined ether solutions are dried and concentrated. The residual oil is distilled in vacuo to give 2-chloro-11,12-dihydro-6H-dibenzo[b,f] [1,4]thiazocine-12-propylamine as a colorless oil.

(d) By substituting 8.5 g. of the product from (c) for the 6.80 g. of 5,11-dihydrodibenz[b,e][1,4]oxazepine-5-propylamine and 4.51 g. of 1,2-dimethyl-2-thiopseudourea sulfate for the 4.09 g. of 2-methyl-2-thiopseudourea sulfate in Example 4, there is obtained 1-{3-[2-chloro-11,12 - dihydro - 6H - dibenzo[b,f][1,4]thiazocin - 12-yl] propyl}-3-methylguanidine hemisulfate.

EXAMPLE 6

1-{3-[2-chloro-11,12-dihydro-6H-dibenzo[b,f][1,4] thiazocin-12-yl]-propyl}guanidine hemisulfate (a) To 300 ml. of a filtered anhydrous ether solution containing 2.0 g. of lithium aluminum hydride is added in small portions 15.3 g. of the finely powdered product from Example 5(a). Subsequently, the mixture is stirred for 2 hours at room temperature and hydrolyzed. The ether layer is separated, the aqueous layer is extracted with ether, the combined ether solutions are dried, and filtered. To the clear ether solution is added ethereal hydrogen chloride until the mixture is acid to Congo Red indicator. The precipitated solid is filtered to give 2-chloro-11,12 - dihydro - 6H - dibenzo[b,f][1,4]thiazocine - 12-propylamine hydrochloride which is purified by recrystallization from isopropanol-anhydrous ether.

(b) To the product from (a) dissolved in a minimum amount of water is added 10% aqueous sodium hydroxide until the pH is about 10.5. The oil which separates is extracted into ether, the ethereal extracts are dried, filtered, and concentrated to give a pale yellow oil as a residue. The residue is dissolved in 50 ml. of 95% ethanol, 2.05 g. of 2 - methyl - 2 - thiopseudourea sulfate added, and the mixture stirred and refluxed for 6 hours. When cooled, the mixture deposits the crystalline product, 1-{3 -[2 - chloro - 11,12 - dihydro - 6H - dibenzo[b,f] [1,4]thiazocin-12-yl]-propyl}guanidine hemisulfate.

EXAMPLE 7

1-{2-[2-bromo-11,12-dihydro-6H-dibenzo[b,f][1,4] thiazocin-12-yl]-ethyl}-1-propylguanidine hydrochloride (a) To a solution of 30.6 g. of 2-bromo-11,12-dihydro-6H - dibenzo[b,f][1,4]thiazocine and 25.0 g. of 2-bromo-ethanol in 500 ml. of anhydrous toluene is added 1.0 g. of a micropulverized 1:1 mixture of copper bronze and potassium iodide and then 34.2 g. of anhydrous barium hydroxide. The mixture is stirred and refluxed for 18 hours, filtered hot, and the filtrate concentrated to dryness to give about 35.1 g. of 2 - bromo - 11,12 - dihydro-6H - dibenzo[b,f][1,4]thiazocine - 12 - ethanol as a pale yellow oil.

(b) The product from (a), 17.6 g. in 250 ml. of anhydrous chloroform is treated dropwise with 6.55 g. of purified thionyl chloride. When the addition is complete, the mixture is refluxed and stirred for 2 hours, and concentrated in vacuo to give about 18.0 g. of 2 - bromo-11,12 - dihydro - 6H - dibenzo[b,f][1,4] - thiazocine-12-ethyl chloride.

(c) The product from (b), 9.23 g., 11.8 g. of anhydrous propylamine, 100 ml. of anhydrous benzene, and 8.2 g. of anhydrous barium hydroxide are stirred and heated in an oil bath maintained at 60° for 18 hours. The cooled mixture is filtered and the filtrate extracted successively with 3–100 ml. portions of ice-cold 10% aqueous hydrochloric acid. The acid extracts are cooled in ice and treated with an excess of 50% aqueousسsodium hydroxide. The oil which separates is extracted into ether, the ether solution is washed with water, dried, and concentrated to give N - {2 - [2 - bromo - 11,12 - dihydro-6H - dibenzo[b,f][1,4]thiazocin - 12 - yl]ethyl}ethyl-N-propylamine.

(d) To 3.91 g. of the product from (c) in 50 ml. of 95% ethanol is added 1.68 g. of 2 - methyl - 2 - thiopseudourea sulfate and the mixture stirred and refluxed for 6 hours. The hot solution is filtered and the filtrate concentrated to dryness in vacuo. The residual solid, 5.0 g., is dissolved in 500 ml. of water and the solution chromatographed on a column containing 100 g. of a strong quaternary ammonium hydroxide resin. The eluate is protected from carbon dioxide and is lyophilized to give 1 - {2 - [2 - bromo - 11,12 - dihydro - 6H - dibenzo[b,f] [1,4]thiazocin - 12 - yl]ethyl} - 1 - propylguanidine as a hygroscopic oil.

Alternatively, the residual solid, 5.0 g., in 500 ml. of nitrogen diffused distilled water and 2.5 g. of barium hydroxide hydrate are shaken for several hours, centrifuged, the supernatant is separated, diffused with nitrogen, and lyophilized to give an oil whose infrared spectrum is identical with that obtained directly above.

(e) The solution of the product from (d) in 25 ml. of nitrogen-diffused 95% ethanol is cooled in ice-water and treated dropwise with ethereal hydrogen chloride until no further precipitation occurs. The solid is filtered and recrystallized from isopropanol-anhydrous ether to give 1 - {2 - [2 - bromo - 11,12 - dihydro - 6H - dibenzo [b,f][1,4]thiazocin - 12 - yl]ethyl} - 1 - propylguanidine hydrochloride.

EXAMPLE 8

1-{3-[11,12-dihydro-6H-dibenzo[b,f][1,4]thiazocin-12-yl]propyl}-guanidine hydrochloride (a) By substituting 22.7 g. of 11,12 - dihydro - 6H-dibenzo[b,f][1,4]thiazocine for the 26.2 g. of 2-chloro-11,12 - dihydro - 6H - dibenzo[b,f][1,4]thiazocine in Example 5(a), there is obtained 11,12 - dihydro - 6H-dibenzo[b,f][1,4]thiazocine-12-propionitrile.

(b) By substituting 14.0 g. of the product from (a) for the 15.3 g. of 2 - chloro - 11,12 - dihydro - 6H - dibenzo[b,f][1,4]thiazocine - 12 - propionitrile in Example 5(c), there is obtained 11,12 - dihydro - 6H - dibenzo[b,f][1,4]thiazocine-12-propylamine hydrochloride.

(c) The product from (b), 3.21 g., 0.42 g. of cyanamide, and 50 ml. of 95% ethanol are refluxed for 6 hours and then concentrated to dryness in vacuo to give 1 - {3 - [11,12 - dihydro - 6H - dibenzo[b,f][1,4]thiazocin-12-yl]propyl}guanidine hydrochloride.

EXAMPLE 9

1-{3-[5,11-dihydrodibenzo[b,e][1,4]thiazepin-5-yl]propyl}guanidine hemisulfate (a) A solution of 21.3 g. of 5,11-dihydrodibenzo[b,e][1,4]-thiazepine in 200 ml. of anhydrous dimethylformamide in a nitrogen atmosphere is treated gradually with 4.8 g. of 50% sodium hydride in mineral oil. The mixture is stirred under nitrogen for 18 hours at room temperature and then 48 g. of 1-bromo-3-chloropropane is added dropwise. Subsequently, the mixture is heated by means of an oil bath maintained at 60° for 18 hours, filtered, and concentrated in vacuo to give 5-(3-chloropropyl)-5,11-dihydrodibenzo[b,e][1,4]thiazepine.

(b) A mixture of 14.5 g. of the product from (a), 18.5 g. of potassium phthalimide, and 200 ml. of anhydrous dimethylformamide is refluxed for 6 hours and then concentrated to give a solid residue. The residue is washed well with water, dried, and recrystallized from isopropanol to give N-{3-[5,11-dihydrodibenzo[b,e,][1,4]thiazepin-5-yl]propyl}phthalimide.

(c) The product from (b), 7.82 g., 2.4 g. of 85% hydrazine hydrate, and 100 ml. of 95% ethanol are refluxed for 12 hours under nitrogen and concentrated to dryness in vacuo to give 5,11-dihydrodibenzo[b,e][1,4]thiazepinepropyl amine.

(d) A mixture of 2.71 g. of the product from (c), 1.65 g. of 2-methyl-2-thiopseudourea sulfate and 50 ml. of 95% ethanol are refluxed for 6 hours, filtered, and cooled to give 1-{3-[5,11-dihydrodibenzo[b,e][1,4]thiazepin-5-yl]propyl}guanidine hemisulfate.

EXAMPLE 10

1-{3-[8-chloro-10,11-dihydrodibenzo[b,f][1,4]thiazepin-10-yl]propyl}guanidine hemisulfate (a) By substituting 24.9 g. of 8-chloro-10,11-dihydrodibenzo[b,f][1,4]thiazepine for the 5,11-dihydrodibenzo[b,e][1,4]thiazepine in Example 9(a), there is obtained 8-chloro-10-(3 - chloropropyl) - 10,11 - dihydrodibenzo[b,f][1,4]thiazepine.

(b) By substituting 16.3 g. of the product from (a) for the 14.5 g. of 5-(3-chloropropyl)-5,11-dihydrodibenzo[b,e][1,4]thiazepine in Example 9(b), there is obtained N-{3-[8-chloro - 10,11 - dihydrodibenzo[b,f][1,4]thiazepin-10-yl]propyl}phthalimide.

(c) By substituting 8.43 g. of the product from (b) for the 7.82 g. of N-{3-[5,11-dihydrodibenzo[b,e][1,4]thiazepin-5-yl]propyl}phthalimide in Example 9(c), there is obtained 8-chloro - 10,11 - dihydrodibenzo[b,f][1,4]thiazepinepropylamine.

(d) A mixture of 3.1 g. of the product from (c), 2.12 g. of cyanogen bromide and 25 ml. of anhydrous methanol is refluxed for 4 hours to give 3-8-chloro-10,11-dihydrodibenzo[b,f][1,4]thiazepinepropylcyanamide.

(e) 16.5 g. of the product from (d), 13.2 g. of ammonium sulfate and 100 ml. of 16% aqueous ammonium hydroxide are heated in a glass lined rocking autoclave at 150° for about 3 hours. The autoclave is allowed to cool, opened, and the reaction mixture removed, cooled to 0°, and the solid filtered to give 1-{3-[8-chloro-10,11-dihydrodibenzo[b,f][1,4]thiazepin - 10 - y]propyl}guanidine hemisulfate.

EXAMPLE 11

1-{2-[10,12-dihydro-5H-dibenz[c,f][1,5]oxazocin-5-yl]ethyl}-1-methylguanidine hemisulfate (a) By substituting 21.1 g. of 10,12-dihydro-5H-dibenz[c,f][1,5]oxazocine for the 30.6 g. of 2-bromo-11,12-dihydro-6H-dibenzo[b,f][1,4]thiazocine in Example 7(a), there is obtained 11,12-dihydro-5H-dibenzo[c,f][1,5]oxazocine-5-ethanol.

(b) By substituting 12.8 g. of the product from (a) for the 17.6 g. of 2-bromo - 11,12 - dihydro-6H-dibenzo[b,f][1,4]thiazocine-12-ethanol in Example 7(b), there is obtained 10,12-dihydro - 5H - dibenz[c,f][1,5]oxazocine-5-ethyl chloride.

(c) When the product from (b), 6.9 g., and 4.6 g. of anhydrous methylamine, are substituted for the 9.23 g. of 2-bromo - 11,12 - dihydro-6H-dibenzo[b,f][1,4]thiazocine-12-ethyl chloride and 11.8 g. of propylamine in Example 7(c), there is obtained N-{2-[10,12-dihydro-5H-dibenz[c,f][1,4]oxazocin-5-yl]ethyl}-N-methylamine.

(d) The product from (c), 2.68 g., 0.84 g. of dry ammonium thiocyanate, and 100 ml. of 95% ethanol are refluxed for 4 hours and cooled to give 1-{2-[10,12-dihydro - 5H - dibenz[c,f][1,5]oxazocin - 5 - yl]ethyl}-1-methyl-2-thiourea.

(e) The product from (d) in 25 ml. of concentrated aqueous ammonia is stirred and heated on the steam bath while small portions of mercuric chloride are added; about 10 g. of the latter reagent are used. The reaction mixture is subsequently heated an additional 0.5 hour, filtered through a Hyflo mat, the filtrate is treated with an excess of 10% sulfuric acid, and cooled to give 1-{2-[10,12 - dihydro - 5H - dibenz[c,f][1,5]oxazocin-5-yl]-ethyl}-1-methylguanidine hemisulfate.

EXAMPLE 12

1-{2-[10,12-dihydro-5H-dibenz[c,f][1,5]oxazocin-5-yl]ethyl}-1-methylguanidine hemisulfate (a) The product from Example 11(d), 3.26 g., is dissolved in 50% aqueous ethanol and the solution treated dropwise with 1.3 g. of dimethyl sulfate. A spontaneous exothermic reaction ensues and external cooling is required to keep the temperature between 25–30°. The mixture is then kept 18 hours at room temperature, cooled, and the solid filtered to give 1-{2-[10,12-dihydro-5H-dibenz[c,f][1,5]oxazocin - 5 - yl]ethyl}1,2-dimethylpseudothiourea sulfate.

(b) The product from (a), 0.81 g. is suspended in 10 ml. of methanol and the stirred suspension treated with 0.5 ml. of concentrated aqueous ammonia and 0.5 g. of ammonium sulfate. Subsequently, the mixture is stirred for 18 hours, filtered with suction through a Hyflo mat, and the filtrate treated with an excess of 10% sulfuric acid to give 1-{2-[10,12-dihydro-5H-dibenz[c,f][1,5]oxazocin-5-yl]ethyl}-1-methylguanidine hemisulfate.

EXAMPLE 13

1-{2-[5,6,12,13-tetrahydrodibenzo[b,f][1,5]oxazonin-5-yl]ethyl}-1-propylguanidine hydrochloride Following the procedure of Example 7 but substituting in 7(a) an equivalent amount of 5,6,12,13-tetrahydrodibenzo[b,f][1,5]oxazonine for the 2-bromo-11,12-dihydro-6H-dibenzo[b,f][1,4]thiazocine, there is obtained the desired 1 - {2-[5,6,12,13-tetrahydrodibenzo[b,f][1,5]oxazonin-5-yl]ethyl}-1-propylguanidine hydrochloride.

EXAMPLE 14

1-{3-[5,6,12,13-tetrahydrodibenzo[b,f][1,5]thiazonin-5-yl]propyl}-1-butylguanidine hydrochloride Following the procedure of Example 8 but substituting [1,5]thiazonine for the 11,12-dihydro-6H-dibenzo[b,f][1,4]thiazocine in 8(a), and butyl cyanamide for the cyanamide in 8(c), there is obtained the desired 1-{3-[5,6,12,13-tetrahydrodibenzo[b,f][1,5]thiazonin - 5 - yl]propyl}-1-butylguanidine hydrochloride.

EXAMPLE 15

5,11-dihydro-7-(trifluoromethyl)dibenz[b,e][1,4]oxazepine-5-propylamine hydrochloride (a) 5,11 - dihydro-7-(trifluoromethyl)dibenz[b,e][1,4]oxazepine-5-propionitrile.—At room temperature, 0.80 ml. of a 40% aqueous solution of benzyltrimethylammonium hydroxide is added to 50.0 g. of 5,11-dihydro-7-(trifluoromethyl)dibenz[b,e][1,4] oxazepine in 60 ml. of acrylonitrile. The solution is refluxed for one hour to give 37.5 g. of 5,11-dihydro - 7 - (trifluoromethyl)dibenz[b,e][1,4]oxazepine-5-propionitrile.

(b) To 0.60 g. of lithium aluminum hydride in 80 ml. of anhydrous ether is added portionwise 5.0 g. of the product from (a). After the addition, the suspension is stirred for one hour and hydrolyzed. The ether is separated, dried, filtered, cooled and treated with ethereal hydrogen chloride to give 5,11-dihydro-7-(trifluoromethyl)dibenz[b,e][1,4]oxazepine-5-propylamine hydrochloride, M.P. about 175–180° (dec.).

EXAMPLE 16

5,11-dihydro-7-(trifluoromethyl)dibenz[b,e][1,4]oxazepine-5-propylamine hydrochloride (a) N-{3-[5,11-dihydro-7-(trifluoromthyl)dibenz[b,e][1,4] - oxazepin-5-yl]propyl}phthalimide.—A mixture of 17.9 g. of potassium phthalimide, 30.0 g. of 5-(3-chloropropyl) - 5,11 - dihydro-7-(trifluoromethyl)dibenz[b,e][1,4]oxazepine and 250 ml. of dimethyl formamide is stirred at reflux under dry nitrogen for 4 hours and concentrated in vacuo to give N-3-[5,11-dihydro-7-(trifluoromethyl)dibenz[b,e][1,4]oxazepin - 5 - yl]propyl phthalimide, M.P. about 112–114°.

(b) The product from (a), 25.0 g., 100 ml. of 95% ethanol, and 3.6 g. of 85% hydrazine hydrate are refluxed for 3 hours, cooled, acidified, filtered, and the filtrate concentrated. The residue is dissolved in water, cooled, made strongly alkaline with 50% aqueous sodium hydroxide, and extracted with ether. The ether extracts are dried, cooled, and treated with ethereal hydrogen chloride to give 5,11-dihydro-7-(trifluoromethyl)dibenz[b,e][1,4]oxazepine-5-propylamine hydrochloride, M.P. about 175–180° (dec.).

EXAMPLE 17

5,11-dihydrodibenz[b,e][1,4]oxazepine-5-propionitrile

To 10.15 g. of 5,11-dihydrodibenz[b,e][1,4]oxazepine in 30 ml. of acrylonitrile is added 0.3 ml. of a 40% methanol solution of benzyltrimethylammonium hydroxide.

The mixture is stirred for 4 hours and the solid filtered to give 5,11 - dihydrodibenz[b,e][1,4]oxazepine-5-propionitrile, M.P. about 138–139°.

EXAMPLE 18

1-{3-[5,11-dihydro-7-(trifluoromethyl)dibenz[b,e][1,4]oxazepin-5-yl]propyl}guanidine, hemisulfate 7.70 g. of 5-(3-aminopropyl)-5,11-dihydro-7-(trifluoromethyl)dibenz[b,e][1,4]oxazepine, 3.67 g. of 2-methyl-2-thiopseudourea sulfate, 40 ml. of 95% ethanol, and 3 ml. of water are refluxed for 6 hours and cooled to give {3 - [5,11 - dihydro - 7 - (trifluoromethyl)dibenz[b,e][1,4]oxazepin-5-yl]propyl}guanidine, hemisulfate, M.P. about 199–206° (dec.).

EXAMPLE 19

1-{3-[10,12-dihydro-5H-dibenz[c,f][1,5]oxazocin-5-yl]propyl}-1-methylguanidine hemisulfate Following the procedure of Example 11, but substituting an equivalent amount of 3-bromopropanol for the 2-bromoethanol (11a), there is obtained 1-{3-[10,12-dihydro - 5H - dibenz[c,f][1,5]oxazocin - 5 - yl]propyl} - 1-methylguanidine hemisulfate.

EXAMPLE 20

1-[2-(10,12-dihydrodibenzo[c,f][1,5]thiazocin-5-yl)ethyl]-1-propylguanidine hydrochloride (a) To 85.0 g. of o-nitro-α-toluenethiol and 125.0 g. of o-bromobenzyl bromide in 1 l. of absolute ethanol is added slowly 27.0 g. of sodium methoxide in 250 ml. of absolute ethanol. The mixture is stirred at room temperature for 8 hours and then poured into 5 l. of water to give o-bromobenzyl o-nitrobenzyl sulfide.

(b) To the product from (a), 33.8 g., in 500 ml. of 95% ethanol is added in one portion at 70°, a slurry of 140.0 g. of $FeSO_4 \cdot 2H_2O$ in 2100 ml. of 1:1 mixture of concentrated (28–30%; sp. g. 0.9) ammonium hydroxide and water. Subsequently, the mixture is refluxed for 5.5 hours, filtered, and the filtrate concentrated to give o-(o-bromobenzylthiomethyl)aniline.

(c) The product from (b), 30.8 g., and 300 ml. of 98–100% formic acid are refluxed for 5 hours and then concentrated in vacuo to give o-(o-bromobenzylthiomethyl)-formanilide.

(d) To 2.0 g. copper bronze, 24.5 g. of micronized anhydrous $K_2CO_3$ and 300 ml. of anhydrous dimethyl formamide, under reflux, is added slowly a solution of 33.6 g. of the product from (c) in 300 ml. of anhydrous dimethyl formamide. The mixture is refluxed for 1 hour, an additional 10 g. of micronized anhydrous $K_2CO_3$ is added, the reflux continued for 2 additional hours, and the hot mixture is filtered. The filtrate is concentrated to dryness in vacuo; the residue, 50 cc. 25% aqueous NaOH and 300 ml. of 95% ethanol, are refluxed for 1 hour and again concentrated to dryness in vacuo. From the residue there is isolated 10,12 - dihydrodibenzo[c,f][1,5]thiazocine.

(e) To a solution of 22.7 g. of 10,12-dihydrodibenzo-[c,f][1,5]thiazocine and 15.0 g. of 2-bromoethanol in 500 ml. of anhydrous toluene is added 1.0 g. of a micropulverized 1:1 mixture of copper bronze and potassium iodide and then 34.2 g. of anhydrous barium hydroxide. The mixture is stirred and refluxed for 18 hours, filtered hot, and the filtrate concentrated to dryness to give about 25.2 g. of 10,12-dihydrodibenzo[c,f][1,5]thiazocine-5-ethanol as a pale yellow oil.

(f) The product from (e), 27.1 g. in 250 ml. of anhydrous chloroform is treated dropwise with 23.8 g. of purified thionyl chloride. When the addition is complete, the mixture is refluxed and stirred for 2 hours, and concentrated in vacuo to give about 30.0 g. of 10,12-dihydrodibenzo[c,f][1,5]thiazocine-5-ethyl chloride.

(g) The product from (f), 28.9 g., 11.8 g. of anhydrous propylamine, 100 ml. of anhydrous benzene, and 8.2 g. of anhydrous barium hydroxide are stirred and heated in an oil bath maintained at 60° for 18 hours. The cooled mixture is filtered and the filtrate extracted successively with 3–100 ml. portions of ice-cold 10% aqueous hydrochloric acid. The acid extracts are cooled in ice and treated with an excess of 50% aqueous sodium hydroxide. The oil which separates is extracted into ether, the ether solution is washed with water, dried, and concentrated to give N - [2-(10,12-dihydrodibenzo[c,f][1,5]thiazocin-12-yl)ethyl]-N-propylamine.

(h) To 3.12 g. of the product from (g) in 50 ml. of 95% ethanol is added 1.68 g. of 2-methyl-2-thiopseudourea sulfate and the mixture stirred and refluxed for 6 hours. The hot solution is filtered and the filtrate concentrated to dryness in vacuo. The residual solid, 4.8 g., is dissolved in 500 ml. of water and the solution chromatographed on a column containing 100 g. of a strong quaternary ammonium hydroxide resin. The eluate is protected from carbon dioxide and is lyophilized to give 1 - [2 - (10,12 - dihydrodibenzo[c,f][1,5]thiazocin - 5-yl)ethyl]-1-propylguanidine as a hygroscopic oil.

Alternatively, the residual solid, 5.0 g., in 500 ml. of nitrogen diffused distilled water and 2.5 g. of barium hydroxide hydrate are shaken for several hours, centrifuged, the supernatant is separated, diffused with nitrogen, and lyophilized to give an oil whose infrared spectrum is identical with that obtained directly above.

(i) The solution of the product from (h) in 25 ml. of nitrogen-diffused 95% ethanol is cooled in ice-water and treated dropwise with ethereal hydrogen chloride until no further precipitation occurs. The solid is filtered and recrystallized from isopropanol-anhydrous ether to give 1-[2 - (10,12 - dihydrodibenzo[c,f][1,5]thiazocin - 5 - yl)-ethyl]-1-propylguanidine hydrochloride.

EXAMPLE 21

1-[3-(3-chloro-10,12-dihydrodibenzo[c,f][1,5]thiazocin-5-yl)propyl]-3-ethylquanidine hemisulfate (a) To 126.5 g. of p-chlorotoluene and 20.0 g. of iron powder at 40° is added 160.0 g. of bromine. The temperature is maintained at 40° during the addition and subsequent aeration to remove HBr. The reaction product is distilled to give 2-bromo-4-chlorotoluene.

(b) The product from (a), 103.0 g., and 1.0 g. of benzoyl peroxide is reacted with 80 g. of bromine at 110° and under illumination by an ultraviolet lamp to give 138 g. of 2-bromo-4-chlorobenzyl bromide.

(c) By substituting 143 g. of 2-bromo-4-chlorobenzyl bromide for the 125.0 g. of o-bromobenzyl bromide in Example 1 (a) and then proceeding through Example 1 (b), (c), and (d), there is obtained 3-chloro-10,12-dihydrodibenzo[c,f][1,5]thiazocine.

(d) To 26.2 g. of 3-chloro-10,12-dihydrodibenzo[c,f][1,5]thiazocine and 60.0 ml. of freshly distilled acrylonitrile at 0° is added dropwise with vigorous stirring, 0.6 ml. of a 40% solution of Triton B in methanol. An exothermic reaction ensues. Subsequently, the mixture is stirred for 4 hours at room temperature to give 3-chloro-10,12 - dihydrodibenzo[c,f][1,5]thiazocine - 5 - propionitrile.

(e) To 300 ml. of a filtered anhydrous ether solution containing 2.0 g. of lithium aluminum hydride is added in small portions 15.3 g. of the finely powdered product from (d). Subsequently, the mixture is stirred for 2 hours at room temperature and hydrolyzed. The ether layer is separated, the aqueous layer is extracted with ether, the combined ether solutions are dried, and filtered. To the clear ether solution is added ethereal hydrogen chloride until the mixture is acid to Congo Red indicator. The precipitated solid is filtered to give 3-(3-chloro-10,12-dihydrodibenzo[c,f][1,5]thiazocin - 5 - yl)propylamine hydrochloride which is purified by recrystallization from isopropanol-anhydrous ether.

(f) To the product from (e), 3.2 g., dissolved in a minimum amount of water is added 10% aqueous sodium hydroxide until the pH is about 10.5. The oil which separates is extracted into ether, the ethereal extracts are dried, filtered, and concentrated to give a pale yellow oil as a residue. The residue is dissolved in 50 ml. of 95% ethanol, 2.16 g. of 1 - ethyl - 2 - methyl - 2 - thiopseudourea sulfate added, and the mixture stirred and refluxed for 6 hours. When cooled, the mixture deposits the crystalline product, 1 - [3 - (3 - chloro - 10,12 - dihydrodibenzo[c,f][1,5]thiazocin - 5 - yl)propyl] - 3 - ethylguanidine hemisulfate.

EXAMPLE 22

1-{3-[10,12-dihydrodibenzo[c,f][1,5]thiazocin-5-yl] propyl}-1-propylguanidine hemisulfate Following the procedure of Example 20, but substituting an equivalent amount of 3-bromopropanol for the 2-bromoethanol in Example 20 (e), there is obtained 1 - {3 - [10,12 - dihydrodibenzo[c,f][1,5]thiazocin - 5-yl]propyl}-1-propylguanidine hemisulfate.

EXAMPLE 23

5,10,12,13-tetrahydrodibenzo[c,f][1,5]thiazonine (a) A mixture of 132.0 g. of o-bromophenethyl bromide, 38.0 g. of thiourea and 250 ml. of 95% ethanol is refluxed for 3 hours. A solution of 30.0 g. of sodium hydroxide in 300 ml. of water is added and the mixture is refluxed for 2 hours. The aqueous layer is separated, acidified and extracted with benzene. The benzene extract is combined with the original organic layer, and washed with water. The benzene solution is dried, the solvent removed, and the residue distilled in vacuo to yield the desired o-bromophenethyl mercaptan.

(b) Following the procedure of Example 24 but substituting an equivalent amount of the 2-bromophenethyl mercaptan for the 2-bromophenethyl alcohol, there is obtained the desired 5,10,12,13 - tetrahydrodibenzo[c,f][1,5]thiazonine.

EXAMPLE 24

5,10,12,13-tetrahydrodibenz[c,f][1,5]oxazonine (a) To a solution of 20.1 g. of o-bromophenethyl alcohol in 200 ml. of anhydrous toluene is added 4 g. of sodamide and the mixture stirred vigorously with gentle warming until the evolution of ammonia is essentially complete. To the cooled mixture is added dropwise and with vigorous stirring a solution of 21.6 g. of o-nitrobenzyl bromide in anhydrous toluene. The reaction mixture is stirred at room temperature for 2 hours and is then warmed on a steam bath for 6 hours. To the cooled mixture is added 300 ml. of water, the aqueous layer separated, dried, and concentrated to yield o-bromophenethyl o-nitrobenzyl ether.

(b) To a solution of 10 g. of the product from (a) in 200 ml. of ethanol is added 0.5 g. of 10% palladium on carbon catalyst and the mixture shaken with hydrogen at 50 p.s.i. until the theoretical quantity of hydrogen has reacted. The mixture is filtered, and concentrated to yield crude o-[o-bromophenethoxymethyl]aniline. The product is dissolved in anhydrous ether, treated with an ethereal solution of hydrogen chloride and the precipitated hydrochloride is filtered and recrystallized from an alcohol-ether mixture. An aqueous solution of the hydrochloride is treated with sodium bicarbonate and the liberated base extracted into ether. The ether solution is dried and concentrated to yield the o-[o-bromophenethoxymethyl]aniline.

(c) To a mixture of 85 g. of 98–100% formic acid is added, in small portions, with cooling and stirring, 55 g. of the product from (b). The reaction mixture is refluxed for 1 hour, concentrated to dryness, and the residue recrystallized from heptane to yield o-[o-bromophenethoxymethyl]formanilide.

(d) A stirred mixture of 5.0 g. of the product from (c), 2.8 g. of micronized anhydrous potassium carbonate, 0.5 g. of copper powder, and 50 ml. of dimethylformamide is heated under nitrogen in an oil bath maintained at 155–160° for 2 hours. The hot mixture is filtered, the filtrate is concentrated to dryness, and the residue triturated with water. The filtered and dried solid is recrystallized from hexane to yield 5,10,12,13-tetrahydrobenz[c,f][1.5]oxazonine-5-carboxaldehyde.

(e) A solution of 10 g. of the product from (d) in 500 ml. of ethanol and 100 ml. of 10% aqueous sodium hydroxide is refluxed for one hour, cooled, neutralized with aqueous hydrochloric acid, and concentrated to dryness. The residue is triturated with water, dried, and recrystallized from hexane to yield the desired 5,10,12,13-tetrahydrodibenz[c,f][1,5]oxazonine.

EXAMPLE 25

7-fluoro-5,10,12,13-tetrahydrodibenz[c,f][1,5]oxazonine

Following the procedure of Example 24 but substituting an equivalent amount of 4-fluoro-o-nitrobenzyl bromide (obtained by the bromination of 4-fluoro-o-nitrotoluene at 150°) for the o-nitrobenzyl bromide, there is obtained the desired 7-fluoro-5,10,12,13-tetrahydrodibenz[c,f][1,5]oxazonine.

EXAMPLE 26

7-fluoro-5,10,12,13-tetrahydrodibenzo[c,f][1,5]thiazonine

Following the procedure of Example 24 but substituting an equivalent amount of 4-fluoro-o-nitrobenzyl bromide for the o-nitrobenzyl bromide and an equivalent amount of o-bromophenethyl mercaptan for the o-bromophenethyl alcohol, there is obtained the desired 7-fluoro-5,10,12,13-tetrahydrodibenzo[c,f][1,5]thiazonine.

EXAMPLE 27

11,12-dihydrodibenz[b,f][1,4]oxazocine (a) To 103 g. of sodium o-nitrophenolate, 103 g. of sodium bromide, and 1100 ml. of N,N-dimethylformamide is added dropwise 186 g. of methyl 2-chloromethylbenzoate in 450 ml. of N,N-dimethylformamide, and the mixture heated about three hours at 85–90° to give about 147 g. of methyl o-[o-nitrophenoxy]methylbenzoate, M.P. about 109–111°.

(b) The product from (a), 144 g., suspended in 3600 ml. of 95% ethanol is stirred and refluxed for 10 minutes and then 31 g. of sodium hydroxide in 750 ml. of water is added as rapidly as possible. The refluxing is continued for an additional 10 minutes, the source of heat removed, and 92 ml. of concentrated hydrochloric acid in 750 ml. of water is added rapidly with vigorous stirring followed by 2100 ml. of water. The mixture is stirred, cooled, and the solid filtered to give about 126 g. of o-[o-nitrophenoxy]methylbenzoic acid, M.P. about 196–198°.

(c) The product from (b), 27 g., 200 ml. of 0.5 N sodium hydroxide and 2.0 g. Raney nickel catalyst are stirred for 10 minutes under nitrogen, and filtered. To the filtrate is added 10 g. of Raney nickel catalyst and the mixture hydrogenated at 50 p.s.i. for three hours to give about 22 g. of o-[o-aminophenoxy]methylbenzoic acid, M.P. about 178–179°.

(d) The product from (c), 8.0 g., in 750 ml. of anhydrous ethyl acetate is cooled to 18° and 7.2 g. of N,N'-dicyclohexylcarbodiimide in 50 ml. of anhydrous ethyl acetate is added, and the mixture stirred for 24 hours to give about 72.7 g. of dibenz[b,f][1,4]oxazocin-11-one.

(e) To 4.8 g. of lithium aluminum hydride in 1200 ml. of anhydrous ether under nitrogen is added portionwise 6.6 g. of dibenz[b,f][1,4]oxazocin-11-one. Subsequently, the reaction mixture is heated under reflux for two hours and worked up to give about 6 g. of 11,12-dihydrodibenz[b,f][1,4]oxazocine, M.P. about 133–135° after recrystallization from Skellysolve E.

EXAMPLE 28

2-trifluoromethyl-11,12-dihydrodibenz[b,f][1,4]oxazocine (a) By substituting 171 g. of sodium o-nitro-p-trifluoromethylphenol for the sodium o-nitrophenolate in Example 27(a) and then proceeding through steps (b), (c), (d), and (e), there is obtained 2-trifluoromethyl-11,12-dihydrodibenz[b,f][1,4]oxazocine.

(b) The o-nitro-p-trifluoromethylphenol is prepared by the reaction of 3-nitro-4-chlorobenzotrifluoride with sodium methoxide to give 3-nitro-4-methoxybenzotrifluoride, followed by cleavage of the latter with pyridine hydrochloride.

EXAMPLE 29

2-(N,N-dimethylsulfamoyl)-11,12-dihydrodibenz[b,f][1,4]oxazocine (a) By substituting 196 g. of sodium N,N-dimethyl-4-hydroxy-3-nitrobenzenesulfonamide for the sodium o-nitrophenolate in Example 26 (a) and then proceeding through steps (b), (c), and (d), there is obtained 2-(N,N-dimethylsulfamoyl)-dibenz[b,f][1,4]oxazocin-11-one.

(b) The 4-hydroxy-3-nitrobenzenesulfonamide is obtained by the nitration of p-hydroxybenzenesulfonic acid followed by conversion of the m-nitro-p-hydroxybenzenesulfonic acid to m-nitro-p-acetoxybenzenesulfonic acid; the latter by treatment with thionyl chloride-N,N-dimethylformamide gives the sulfonyl chloride, and this, when treated with an excess of aqueous dimethylamine gives the desired 4-hydroxy-3-nitrobenzenesulfonamide.

(c) By substituting 9.6 g. of the product from (a) for the dibenz[b,f][1,4]oxazocin-11-one in Example 8(e) there is obtained 7.6 g. of 2-(N,N-dimethylsulfamoyl)-11,12-dihydrodibenzo[b,f][1,4]oxazocine.

EXAMPLE 30

7-chloro-11,12-dihydrobenz[b,f][1,4]oxazocine (a) By substituting 222 g. of methyl 3-chloro-2-chloromethylbenzoate for the methyl 2-chloromethylbenzoate in Example 27(a), there is obtained, following the procedure of the steps 27(b), (c), (d), and (e), 7-chlorodibenz[b,f][1,4]oxazocin-11-one.

(b) The chlorination of o-xylene gives 3-chloro-o-xylene; dilute nitric acid oxidation of the 3-chloro derivative gives a mixture of products from which m-chloro-o-toluic acid is isolated by distillation; the latter, following conversion to the methyl ester and treatment with sulfuryl chloride, gives the required methyl 3-chloro-2-chloromethylbenzoate.

EXAMPLE 31

7-chloro-2-methyl-11,12-dihydrodibenz[b,f][1,4]oxazocine (a) Employing 222 g. of methyl 3-chloro-2-chloromethylbenzoate, prepared as described in Example 30(b) and sodium-o-nitro-p-cresol and proceeding through steps (a), (b), (c), (d), and (e) of Example 27, there is obtained 7 - chloro-2-methyl-11,12-dihydrodibenz[b,f][1,4]oxazocine.

EXAMPLE 32

2-methyl-11,12-dihydrodibenz[b,f][1,4]oxazocine

By substituting 117 g. of sodium o-nitro-m-cresol for the sodium o-nitrophenolate in Example 27(a) and then proceeding through steps (b), (c), (d), and (e) of Example 27, there is obtained 2-methyl-11,12-dihydrodibenz[b,f][1,4]oxazocine.

EXAMPLE 33

3-methoxy-11,12-dihydrodibenz[b,f][1,4]oxazocine

By substituting 133 g. of sodium 2-nitro-5-methoxyphenolate for the sodium o-nitrophenolate in Example 27(a) and then proceeding through steps (b), (c), (d), and (e) of Example 27, there is obtained 3-methoxy-11,12-dihydrodibenz[b,f][1,4]oxazocine.

The 2-nitro-5-methoxyphenol is prepared by the nitration of m-chloroanisole, separation of m-chloro-p-nitroanisole, and then reacted as in Example 30(b).

EXAMPLE 34

2-acetyl-11,12-dihydrodibenz[b,f][1,4]oxazocine

By substituting 131 g. of sodium o-nitro-p-acetylphenolate for the sodium o-nitrophenolate in Example 27(a) and then proceeding through steps (b), (c), (d), and (e) of Example 27 there is obtained 2-acetyl-11,12-dihydrodibenz[b,f][1,4]oxazocine.

15

The o-nitro-p-acetylphenol is obtained by rearrangement of o-nitrophenyl acetate.

EXAMPLE 35

10,11-dihydrodibenz[b,e][1,4]oxazocine (a) To a solution containing 132.0 g. of o-bromophenethyl bromide and 68.5 g. of o-formamidophenol in 500 ml. of absolute ethanol is added a solution of 27.0 g. of sodium methoxide in 500 ml. of absolute ethanol in one hour at room temperature. Subsequently, the mixture is stirred at room temperature for 18 hours and then poured into 5 l. of ice-water to give 100.0 g. of o-(o-bromophenethyloxy)-formanilide.

(b) By substituting 32.0 g. of the compound from (a) for the o-(o-bromobenzylthiomethyl)formanilide in Example 20(d) and proceeding according to that example, there is obtained 10,11- dihydrodibenz[b,e][1,4]oxazocine.

EXAMPLE 36

3-chloro-10,11-dihydrodibenz[b,e][1,4]oxazocine

By substituting 85.8 g. of 4-chloro-2-formamidophenol (prepared by refluxing 4-chloro-2-aminophenol with 98–100% formic acid for three hours) in Example 35(a) for the o-formamidophenol, and then proceeding according to sections (a) and (b) of Example 20, there is obtained 3-chloro-10,11-dihydrodibenz[b,e][1,4]oxazocine.

EXAMPLE 37

3-trifluoromethyl-10,11-dihydrodibenz-[b,e][1,4]ozaxocine

By substituting 102.5 g. of 4-trifluoromethyl-2-formamidophenol (prepared from 4-trifluoromethyl-2-aminophenol by refluxing for two hours with 98–100% formic acid) for the o-formamidophenol in Example 35(a) and then proceeding according to Example 35(a) and (b), there is obtained 3-trifluoromethyl-10,11-dihydrodibenz-[b,e][1,4]oxazocine.

EXAMPLE 38

10,11-dihydrodibenzo[b,e][1,4]thiazocine (a) By substituting 62.5 g. of o-aminobenzenethiol for the o-formamidophenol in Example 35(a) and then proceeding according to Example 35(a), there is obtained o-(o-bromophenethylthio)aniline.

(b) The product from (a), 103.5 g., and 200 ml. of 98–100% formic acid are heated under reflux for four hours, 100 ml. of formic acid distilled, and the residue poured into 250 ml. of ice-water to give o-(o-bromophenethylthio)formanilide.

(c) The product from (b), 33.6 g., substituted for the o-(o-bromophenethyloxy)formanilide in Example 35(b) and then proceeding according to Example 35(b), there is obtained 10,11-dihydrodibenzo[b,e][1,4]thiazocine.

EXAMPLE 39

11,12-dihydrodibenz[b,f][1,5]oxazocine (a) To 153.0 g. of o-nitrobenzyl alcohol in 500 ml. of dry toluene is added in small portions a total of 54.0 g. sodium methoxide. Subsequently, the mixture is refluxed for three hours using an air-cooled condenser and allowing the methanol to distil. To the cooled reaction mixture is added slowly 170.5 g. of methyl o-chlorobenzoate. The mixture is subsequently stirred and refluxed for 24 hours, cooled filtered and the filtrate concentrated to give methyl o-(o-nitrobenzyloxy)benzoate.

(b) The product from (a), 57.4 g., 250 ml. of 95% ethanol and 25 ml. of 40% aqueous sodium hydroxide are refluxed for three hours and filtered. To the cooled filtrate is added 5.0 g. of freshly prepared Raney nickel and the whole is hydrogenated at 50 p.s.i. for two hours when the theoretical amount of hydrogen has been absorbed. The catalyst is filtered and the filtrate is acidified with 20% hydrochloric acid to give o-(o-aminobenzyloxy)benzoic acid.

(c) The solid from (b), 24.3 g., and 250 ml. of dry xylene are heated under a Dean-Stark trap until no water separates in the distillate; this cyclodehydration requires six hours. The xylene solution is filtered and concentrated to give dibenzo[b,f][1,5]oxazocin-12-one.

(d) By substituting 6.6 g. of the product from (c) for the dibenzo[b,f][1,4]oxazocin-11-one in Example 27 (d), there is obtained 11,12-dihydrodibenz[b,f][1,5]oxazocine.

EXAMPLE 40

3-chloro-11,12-dihydrodibenz[b,f][1,5]oxazocine

By substituting 205.0 g. of methyl 2,4-dichlorobenzoate for the methyl o-chlorobenzoate in Example 39(a) and then proceeding as in Examples 39(a), (b), (c) and (d), there is obtained 9-chloro-11,12-dihydrodibenz[b,f][1,5]-oxazocine.

EXAMPLE 41

3-chloro-11,12-dihydrodibenzo[b,f][1,5]thiazocine (a) By employing the procedure of Example 23(a) but using 108.0 g. of o-nitrobenzyl bromide in place of 2-bromophenethyl bromide, there is obtained o-nitrobenzyl mercaptan.

(b) To the product from (a), 84.5 g., and 102.5 g. of methyl 2,4-dichlorobenzoate in 500 ml. of absolute ethanol is added in one hour a solution of 27.0 g. of sodium methoxide in 250 ml. of aboslute ethanol. Subsequently, the mixture is refluxed for four hours, filtered, and the filtrate diluted with 25 ml. of 40% aqueous sodium hydroxide. This solution is refluxed for three hours, cooled, and the solution stirred with 5.0 g. of Raney nickel for fifteen minutes. The catalyst is filtered, to the filtrate is again added 5.0 g. of freshly prepared Raney nickel and the mixture hydrogenated as in Example 39(b) to give o-(o-aminobenzylthio)-4-chlorobenzoic acid.

(c) The product from (b), 29.4 g., substituted for the o-(o-aminobenzyloxy)benzoic acid in Example 39(c) gives 3-chloro-11,12-dihydrodibenzo[b,f][1,5]thiazocine.

EXAMPLE 42

5,7,12,13-tetrahydrodibenz[c,g][1,5]oxazonine

By substituting 184.5 g. of methyl o-(chloromethyl)-benzoate for the methyl o-chlorobenzoate in Eaxmple 39(a), there is obtained methyl o-(o-nitrobenzyloxymethyl)benzoate. Then, proceeding as described, in Examples 39(b), (c), and (d), gives the product 5,7,12,13-tetrahydrodibenz[c,g][1,5]oxazonine.

EXAMPLE 43

5,7,12,13-tetrahydrodibenzo[c,g][1,5]thiazonine (a) By substituting 109.5 g. of methyl o-(chloromethyl)benzoate for the methyl 2,4-dichlorobenzoate in Example 41(b), there is obtained methyl o-(nitrobenzylthiomethyl)benzoate.

(b) To the product from (a), 95.4 g., in 1500 ml. of 95% ethanol is added, at 70°, a slurry of 420.0 g. of $FeSO_4 \cdot 2H_2O$ in 6300 ml. of a 1:1 mixture of concentrated ammonium hydroxide and water. The mixture is then heated under reflux for six hours, filtered, and the filtrate concentrated to give methyl o-(o-aminobenzylthiomethyl)benzoate.

(c) A solution of 28.8 g. of the product from (b) and 250 ml. of dry xylene is heated under an air condenser, allowing the methanol to distil during six hours and then worked up to give 5,7-dihydrodibenzo[c,g][1,5]thiazonin-12-one.

(d) By substituting 8.6 g. of the product from (c) for the 6.6 g. of the dibenz [b,f][1,5]oxazocin-12-one in Example 39(d), there is obtained 5,7,12,13-tetrahydrodibenz[c,g][1,5]thiazonine.

EXAMPLE 44

4-methyl-5,7,12,13-tetrahydrodibenzo[c,g][1,5]thiazonine (a) o-Bromoethylbenzene is converted in the conventional manner to o-ethylphenylmagnesium bromide and the latter treated with solid $CO_2$ to give o-ethylbenzoic acid. Following esterification with methanolic hydrogen chloride, the methyl o-ethylbenzoate is treated with sulfuryl chloride in chloroform solution to give methyl o-(1-chloroethyl)benzoate.

(b) By substituting the product from (a), 123.5 g., for the methyl o-(chloromethyl)benzoate in Example 42(a), there is obtained, following the procedure of Examples 43(b), (c), and (d), 5-methyl-5,7,12,13-tetrahydrodibenzo[c,g][1,5]thiazonine.

EXAMPLE 45

13-methyl-5,10,12,13-tetrahydrodibenz[c,g][1,5]oxazonine

By substituting 21.5 g. of o-bromo-1-methylphenethyl alcohol for the o-bromophenethyl alcohol in Example 24 (a) and then proceeding as in Examples 24(b), (c), (d), and (e), there is obtained 13-methyl-5,10,12,13-tetrahydrodibenz[c,g][1,5]oxazonine.

EXAMPLE 36

1-benzyl-3-[3-(5,10,12,13-tetrahydrodibenzo[c,f][1,5]-thiazonin-5-yl)propyl]guanidine (a) To 22.7 g. of 5,10,12,13-tetrahydrodibenzo[c,f]-[1,5]thiazonine in 60.0 ml. of purified acrylonitrile, at 0°, is added dropwise with vigorous stirring 0.6 ml. of a 40% solution of Triton B in methanol. Subsequently, the mixture is stirred for four hours at room temperature and extracted with 500 ml. of boiling benzene, the benzene solution is filtered at the boiling point, and the filtrate cooled to give 5,10,12,13 - tetrahydrodibenzo[c,f][1,5]-thiazonine-5-propionitrile.

(b) To an anhydrous ether solution containing 2.0 g. of lithium aluminum hydride is added 14.1 g. of the product from (a) and the mixture stirred for two hours at room temperature. Workup gives 3-(5,10,12,13-tetrahydrodibenzo[c,f][1,5]thiazonin-5-yl)propylamine:

(c) A solution of 2.85 g. of the product from (b) and 1.32 g. of benzylcyanamide in 25 ml. of absolute ethanol is refluxed for four hours under a nitrogen atmosphere to give 1-benzyl-3-[3 - (5,10,12,13 - tetrahydrodibenzo[c,f]-[1,5]thiazonin-5-yl)propyl]guanidine.

EXAMPLE 47

1-benzyl-1-ethyl-2-[3-(5,10,12,13-tetrahydrodibenz-[c,f][1,5]oxazonin-5-yl)propyl]guanidine (a) Following the procedure of Example 46(a) but substituting 21.1 g. of 5,10,12,13-tetrahydrodibenzo[c,f]-[1,5]oxazonine for the 5,10,12,13-tetrahydrodibenzo[c,f]-[1,5]thiazonine in that example and then proceeding through Example 36(b), there is obtained 3-(5,10,12,13-tetrahydrodibenz[c,f][1,5]oxazonin-5-yl)propylamine.

(b) Following the procedure of Example 46(c), but employing 1.60 g. of benzylethylcyanamide and 2.79 g. of the product from (a), there is obtained 1-benzyl-1-ethyl-2-[3-(5,10,12,13 - tetrahydrodibenz[c,f][1,5]oxazonin-5-yl)-propyl]guanidine.

EXAMPLE 48

1-[3-(11,12-dihydrodibenz[b,f][1,4]oxazocin-12-yl)propyl]-2-phenylguanidine (a) When 21.1 g. of 11,12-dihydrodibenz[b,f][1,4]-oxazocine is substituted for the 5,10,12,13-tetrahydrodibenzo[c,f][1,5]thiazonine in Example 46(a), there is obtained by that procedure 11,12-dihydrodibenz[b,f][1,4]-oxazocine-12-propionitrile; the latter, when subjected to reduction by the procedure of Example 46(b), gives 3-(11,12-dihydrodibenz[b,f][1,4]oxazocin - 12 - yl)propylamine.

(b) A solution of 2.69 g. of the product from (a), 1.2 g. of phenylcyanamide, and 25 ml. of absolute ethanol is refluxed for four hours under a nitrogen atmosphere to to give 1-[3-(11,12-dihydrodibenz[b,f][1,4]oxazocin-12-yl)propyl]-2-phenylguanidine.

EXAMPLE 49

6,7,12,13-tetrahydrodibenz[b,f][1,4]thiazonine (a) o-(2-hydroxyethyl)benzonitrile.—To 100.5 g. of o-bromophenethyl alcohol in 500 ml. of dry pyridine is added in portions a total of 90.0 g. of carefully dried cuprous cyanide. Subsequently, the mixture is stirred and refluxed for seventy-two hours, filtered, and the filtrate concentrated in vacuo and the residue distilled to give o-(2-hydroxyethyl)benzonitrile.

(b) o-(2-hydroxyethyl)benzoic acid.—The product from (a), 149.0 g., 500 ml. of 95% ethanol, and 40.0 g. of sodium hydroxide are stirred and heated under reflux for four hours and the ethanol distilled. The cooled residue is dissolved in 500 ml. of ice-water, and the solution treated with an excess of aqueous hydrochloric acid to precipitate o-(2-hydroxyethyl)benzoic acid.

(c) o-(2-bromoethyl)benzoic acid.—The product from (b), 149.0 g., and 250 ml. of 48% hydrobromic acid are warmed at 90° for six hours and then concentrated to dryness in vacuo at a temperature below 50°. The residue of o-(2-bromoethyl)benzoic acid is used without further purification.

(d) o-[2-(o-aminophenoxy)ethyl]benzoic acid.—To 13.7 g. of o-hydroxyformanilide, 22.9 g. of the product from (c) and 150 ml. of absolute ethanol, at room temperature is added dropwise, with vigorous agitation, a solution of 5.4 g. of sodium methoxide in 60 ml. of absolute ethanol. The mixture is stirred for eighteen hours at room temperature and then diluted with a solution of 4.0 g. of sodium hydroxide in 40 ml. of water and the mixture stirred and refluxed for one hour. The cooled mixture is poured into 1 l. of cold water to give o-[2-(o-aminophenoxy)ethyl]benzoic acid.

(e) 6,7-dihydrodibenz[b,f][1,4]oxazonin-12-one.—To a solution of 27.3 g. of the product from (d) in 500 ml. of ethyl acetate is added dropwise at room temperature 200 ml. of an ethyl acetate solution containing 20.6 g. of dicyclohexyl carbodiimide. Subsequently, the mixture is stirred for 72 hours at room temperature, filtered from dicyclohexylurea and the filtrate concentrated to give 6,7-dihydrodibenz[b,f][1,4]oxazonin-12-one.

(f) 6,7,12,13-tetrahydrodibenz[b,f][1,4]oxazonine.—To the product from (e), 12.8 g., in 500 ml. of dry ether at 10° is added dropwise a dry ether solution containing 3.9 g. of lithium aluminum hydride. Subsequently, the mixture is stirred, refluxed for one hour, cooled, hydrolyzed with 10 ml. of 10% aqueous sodium hydroxide, the ether layer separated, washed with saturated aqueous sodium chloride solution, dried and concentrated to give 6,7,12,13-tetrahydrodibenz[b,f][1,4]oxazonine.

EXAMPLE 50

2-chloro-6,7,12,13-tetrahydrodibenzo[b,f][1,4]thiazonine (a) o-[2-(2-amino-4 - chlorophenylthio)ethyl]benzoic acid.—A mixture of 45.8 g. of the product from Example 50(c), 32.1 g. of redistilled 2-amino-4-chlorobenzenethiol, and 500 ml. of absolute ethanol is diffused with nitrogen and treated slowly with 10.8 g. of sodium methoxide in 150 ml. of absolute ethanol. The mixture is subsequently stirred for 18 hours at room temperature to give o-[2-(2-amino-4-chlorophenylthio)ethyl]benzoic acid.

(b) 2-chloro-6,7-dihydrodibenzo[b,f][1,4]thiazonin-12-one.—By substituting 32.5 g. of the product from (a) for the o-[2-(o-aminophenoxy)ethyl]benzoic acid in Example 50(e) and then proceeding as in that example, there is obtained 2-chloro-6,7-dihydrodibenzo[b,f][1,4]-thiazonin-12-one.

(c) 2-chloro-6,7,12,13 - tetrahydrodibenzo[b,f][1,4]-thiazonine.—By substituting 15.4 g. of the product from (b) for the 6,7-dihydrodibenz[b,f][1,4]oxazonin-12-one in Example 50(f), and then proceeding as in that example, there is obtained 2-chloro-6,7,12,13-tetrahydrodibenz[b,f][1,4]thiazonine.

EXAMPLE 51

The heterocycles of Examples 23–50 are treated according to the procedures of Examples 20(e), (f), (g) and (h) to give the N-substituted compounds of the present invention.

What is claimed is:
1. A compound having the formula

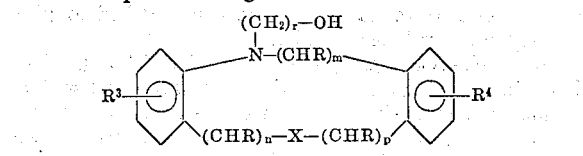

wherein R is hydrogen, lower alkyl, phenyl or phenyl-lower alkyl; $R^3$ and $R^4$ are hydrogen, halogen, lower alkyl, trifluoromethyl or lower alkoxy; X is oxygen or sulfur; $r$ is 2 to 5; $m$ is 0 or 1; $n$ and $p$ are each 0, 1 or 2; provided that the sum of $m+n+p$ is from 1 to 3, and that when $m$ equals 1 and $n$ and $p$ are each 0, X is sulfur.

References Cited
UNITED STATES PATENTS
3,452,046  6/1969  Yale et al. _____ 260—327 B HENRY R. JILES, Primary Examiner
C. M. SHURKO, Assistant Examiner U.S. Cl. X.R.
260—326 D, 333; 424—275, 278

QB63a

PO-1050
(5/69)

UNITED STATES PATENT OFFICE
CERTIFICATE OF CORRECTION

Patent No. 3,657,275     Dated April 18, 1972

Inventor(s) Harry L. Yale and Jack Bernstein

It is certified that error appears in the above-identified patent and that said Letters Patent are hereby corrected as shown below:

Column 1, line 63, "stems." should read - - atoms. - -; and on line 69, "bromo-phenyl" should read - - bromophenyl - -. Column 4, line 43, after "give" should be inserted - -, the - -; and on line 69, "xample" should read - - ample - -. Column 5, line 11, "249.0-0.253.5°" should read - - 249.0-253.5° - -. Column 6, line 58, "ethyl ethyl-N-" should read - - ethyl -N-. Column 9, line 5, after "substituting" should be inserted - - equivalent amounts of 5,6,12,13-tetrahydrodibenzo[b,f] - -; and on line 36, "(trifluoromthyl)" should read - - (trifluoromethyl) - -. Column 10, line 41, "drynes" should read - - dryness - -. Column 11, line 26, "ethylquanidine" should read - - ethyl-guanidine - -. Column 13, line 34, "72.7" should read - - 2.7 - -. Column 14, line 24, "dihydrobenz" should read - - dihydrodibenz - -. Column 15, line 62, after "54.0 g." should be inserted - - of - -; and on line 68, "cooled filtered" should read - - cooled, filtered - -. Column 17, line 2, "4-methyl" should read - - 5-methyl - -; and on line 17, "[c,g]" should read - - [c,f] - -; and on line 24, "[c,g]" should read - - [c,f] - -; and on line 25, "36" should read - - 46 - -; and on line 42, "propylamine:" should read - - propylamine. - -; and on line 57, "36(b)" should read - - 46(b) - -. Column 20, line 6, "each O" should read - - each 0 - -.

Signed and sealed this 5th day of December 1972.

(SEAL)
Attest:

EDWARD M. FLETCHER, JR.
Attesting Officer

ROBERT GOTTSCHALK
Commissioner of Patents